(12) United States Patent
Perdrigeon et al.

(10) Patent No.: US 10,436,212 B2
(45) Date of Patent: Oct. 8, 2019

(54) FAN, IN PARTICULAR FOR A TURBINE ENGINE

(71) Applicant: Snecma, Paris (FR)

(72) Inventors: Christophe Perdrigeon, Moissy Cramayel (FR); Laurent Jablonski, Moissy Cramayel (FR); Philippe Gérard Edmond Joly, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 473 days.

(21) Appl. No.: 15/100,475

(22) PCT Filed: Nov. 24, 2014

(86) PCT No.: PCT/FR2014/053017
§ 371 (c)(1),
(2) Date: May 31, 2016

(87) PCT Pub. No.: WO2015/079154
PCT Pub. Date: Jun. 4, 2015

(65) Prior Publication Data
US 2016/0298642 A1      Oct. 13, 2016

(30) Foreign Application Priority Data

Nov. 29, 2013   (FR) ...................................... 13 61906

(51) Int. Cl.
*F01D 5/06*   (2006.01)
*F01D 5/30*   (2006.01)
(Continued)

(52) U.S. Cl.
CPC ............. *F04D 29/34* (2013.01); *F01D 5/066* (2013.01); *F01D 5/3007* (2013.01);
(Continued)

(58) Field of Classification Search
CPC ...... F01D 5/066; F01D 5/3007; F01D 5/3015; F01D 5/323; F04D 29/322; F04D 29/329; F04D 29/34; F05D 2220/36
See application file for complete search history.

(56) References Cited

U.S. PATENT DOCUMENTS 5,160,243 A    11/1992   Herzner et al.
5,240,375 A *   8/1993   Wayte ...................... F01D 5/28
                                                                416/219 R
(Continued)

FOREIGN PATENT DOCUMENTS

EP    1 357 254 A2   10/2003
EP    1 995 467 A1   11/2008
(Continued)

*Primary Examiner* — Woody A Lee, Jr.
*Assistant Examiner* — Christopher R Legendre
(74) *Attorney, Agent, or Firm* — Blank Rome LLP (57) ABSTRACT

The invention relates to a fan, in particular for a small turbine engine such as a jet engine, having a hub ratio corresponding to the ratio of the diameter of the inner limit of the air intake section (26) at the radially internal ends of the leading edges of the fan blades (10), divided by the diameter of the circle through which the outer ends of the fan blades pass, which has a value of 0.25 to 0.27.

16 Claims, 6 Drawing Sheets (51) Int. Cl.
*F01D 5/32* (2006.01)
*F04D 29/32* (2006.01)
*F04D 29/34* (2006.01)
*F04D 29/38* (2006.01)
*F04D 29/52* (2006.01)

(52) U.S. Cl.
CPC ......... *F01D 5/3015* (2013.01); *F04D 29/322* (2013.01); *F04D 29/329* (2013.01); *F04D 29/38* (2013.01); *F04D 29/526* (2013.01); *F01D 5/323* (2013.01); *F05D 2220/36* (2013.01); *F05D 2260/30* (2013.01); *F05D 2260/33* (2013.01); *F05D 2300/174* (2013.01); *Y02T 50/671* (2013.01)

(56) References Cited

U.S. PATENT DOCUMENTS

| | | | | |
|---|---|---|---|---|
| 6,722,847 B2* | 4/2004 | Freeman | ............... | B64C 11/001 415/119 |
| 7,516,547 B2* | 4/2009 | McCann | ............... | C23C 4/04 29/889.3 |
| 8,092,183 B2* | 1/2012 | Borzakian | ............... | F01D 5/027 416/219 R |
| 8,529,208 B2* | 9/2013 | Brault | ............... | F01D 5/22 416/191 |
| 8,573,947 B2* | 11/2013 | Klinetob | ............... | F01D 5/025 416/229 A |
| 8,740,568 B2* | 6/2014 | Millier | ............... | F01D 5/323 416/219 R |
| 8,911,212 B2* | 12/2014 | Delapierre | ............... | F01D 5/066 416/204 A |
| 9,303,589 B2* | 4/2016 | Heikurinen | ............... | F04D 29/023 |
| 9,540,935 B2* | 1/2017 | Perdrigeon | ............... | F01D 5/3015 |
| 2008/0232969 A1* | 9/2008 | Brault | ............... | F01D 5/22 416/219 R |
| 2009/0022593 A1* | 1/2009 | Oka | ............... | F01D 5/3015 416/220 R |
| 2009/0285686 A1 | 11/2009 | Violette et al. | | |
| 2010/0034659 A1* | 2/2010 | Fujimura | ............... | F01D 5/3007 416/219 R |
| 2011/0223027 A1* | 9/2011 | Klinetob | ............... | F01D 5/025 416/219 R |
| 2012/0282104 A1* | 11/2012 | Jablonski | ............... | F01D 5/3007 416/219 R |
| 2016/0298642 A1* | 10/2016 | Perdrigeon | ............... | F01D 5/3007 |
| 2016/0363047 A1* | 12/2016 | Schwarz | ............... | F01D 5/14 |
| 2017/0167504 A1* | 6/2017 | Jablonski | ............... | F01D 5/34 |

FOREIGN PATENT DOCUMENTS

| | | |
|---|---|---|
| EP | 2 128 450 A1 | 12/2009 |
| FR | 2 971 822 A1 | 8/2012 |
| JP | 5-71304 A | 3/1993 |
| JP | 2011-521153 A | 7/2011 |
| RU | 2 018 037 C1 | 8/1994 |
| WO | WO 2008/117413 A1 | 10/2008 |

* cited by examiner

FAN, IN PARTICULAR FOR A TURBINE ENGINE

The present invention relates to obtaining a particular dimensioning of a fan, particularly for a turbine engine such as a turbojet.

The invention is a real technical challenge and of special relevance when it relates to turbine engines, the exterior dimensions of which have been so designed as to adapt to the field of business aviation. Such relatively small-sized turbine engines typically have an inlet diameter, defined by the diameter upstream of the turbine engine section, which ranges from 900 mm to 1,550 mm, to have dimensions closely related to a total mass and adapted for mounting on aircrafts like executive jets.

As with any type of turbine engine, the developments relating to this type of small-sized turbine engines mainly aim at improving performances, reducing consumption and saving on weight. Such development paths are numerous and may for example relate to the selection of materials, the design of blades, the optimization of the mechanical connections between the parts, the prevention of leaks, etc.

One of the generally followed development paths is the reduction in the hub ratio of the turbine engine fan. This hub ratio is the ratio of the external diameter of the hub at the leading edges of the fan blades to the diameter of the circle wherethrough the radial ends of the fan blades pass. The reduction in the hub ratio generally involves a radial reduction in the hub size, and thus a saving on weight, but also involves an increase in the suction section of the turbine engine, thus resulting in an increase in the air flow propelling the turbine engine, and thus a gain in performances. However, considering the current expertise in the design and manufacture of small-sized turbine engines such as those having an inlet diameter as defined above, this type of turbine engine is considered as not allowing a reduction in the external diameter of the hub, specifically at the leading edges of the fan blades, below the diameter currently used which typically ranges from 570 to 585 mm. As a matter of fact, the current dimensions of the mechanical components making up the hub are considered as non-reducible, mainly for obvious issues like mechanical strength, torsional strength, tolerances and manufacturing methods, tools accessibility etc. of the radial blades.

The present invention goes against such technical prejudices and provides for a selection of particular dimensions of a fan for a turbine engine, and thus a significant improvement of performances and saving in weight.

For this purpose, the invention provides for a fan, particularly for a turbine engine such as a turbojet, with the fan comprising at the inlet fan blades, an annular casing, a hub rotating about an axis of the turbine engine and carrying the blades, which extend radially relative to said axis in an annular section delimited internally by the hub and externally by the annular casing, with said hub comprising a fan disc having, at its outer periphery, substantially axial ribs alternating with grooves wherein the roots of the blades are engaged, with said fan having an inlet diameter matching the diameter of the circle comprising the radially external ends of the blades, having a value between 900 mm and 1,550 mm, and having a hub ratio, which is the ratio of the diameter of the inner limit of the section at the radially internal ends of the leading edges of the fan blades divided by the inlet diameter having a value between 0.20 and 0.265.

An inlet diameter having a value ranging from 900 mm to 1,200 mm is more particularly provided to obtain even more advantageous results in terms of mass. As will be explained later, the particular selection of such external diameter is the issue of a particularly important technical prejudice.

Besides, the invention provides for a specific mechanical arrangement of the rotor of the fan which is particularly well suited to this selected dimensions.

The rotor of a fan of a turbine engine generally comprises a disc having, at its outer periphery, blades the roots of which are engaged into substantially axial grooves in the outer periphery of the disc. The blades are radially held on the disc since the shape of their roots fits that of the grooves of the disc, with the blade roots being for example dovetail-shaped. Inter-blade platforms are mounted on the disc between the fan blades. The disc is generally equipped with balancing leeks extending radially inwards.

In the current art, the blades are axially held on the disc using means which are mounted on the disc, upstream and downstream of the blades, and which prevent the blade roots from moving axially in the grooves of the disc.

The holding means located downstream of the blades for example comprise at least a blade root hook which is engaged into a notch machined in an upstream end part of the low pressure compressor arranged downstream of the fan. The grooves of the disc must be radially enlarged relative to the blade roots to enable the mounting of the hooks in the notches of the low pressure compressor. The blades can thus be moved at the bottom of the grooves and the hooks of the blade roots can be positioned in radial alignment opposite the notches. The blades can then radially be raised in the grooves using sufficiently thick shims, arranged at the bottom of the grooves in order to engage the hooks of the blade roots into the notches and to hold the blades in the upper position.

The retaining means upstream comprise for example an inserted annular flange fixed to the upstream end of the disc. The flange is coaxially mounted on the disc, and includes a curled portion cooperating with a matching curled portion of the disc. This flange axially blocks the ring on the disc and is prevented from rotating relative to the disc. The outer periphery of the flange axially bears onto the blade roots so as to axially hold same downstream, with the inner periphery thereof being applied to and fixed on a matching annular clamp of the disc. The outer periphery of the flange further comprises pins for fixing the upstream ends of the inter-blade platforms.

A substantially frusto-conical shroud mounted on the disc, upstream of the blades, internally delimits the annular air intake section in the turbine engine. This shroud comprises, in the vicinity of its downstream end, a radially inner annular clamp which is axially applied onto said flange and is fixed with the flange on the disc flange using bolts.

A frusto-conical cover is further mounted on said shroud at the upstream part thereof, using other bolts engaged into holes of the cover and shroud clamps and which are located radially inside the bolts for mounting the shroud on the disc.

Such a structure cannot be used when the fan has a small diameter. As a matter of fact, the radial space is not sufficient to accommodate all the aforementioned bolts and clamps. More particularly, it is difficult to accommodate the bolts and the clamps used for fixing the cover on the shroud.

Besides, the disc is fixed to a drive shaft by means of nuts screwed on the shaft using radial clamps. Such nuts must be axially accessed to with a tool to mount and dismount the fan rotor. For this purpose, the operator must have sufficient space around the central axis.

When the fan has a small diameter, the prior art structure described above does not provide access to the aforementioned means for fixing the disc on the shaft."

The prior art thus does not permit, in accordance with the mentioned technical prejudice, to form a fan having dimensions and a hub ratio defined by the invention.

The document EP 1357254 also discloses a fan rotor, the structure of which has large radial and axial overall dimensions.

The document WO 2012/114032 describes a structure which allows the production of a compact fan with a small diameter, using a ring attached to the disc and having axial teeth preventing the rotation of the flange. However, this structure is not perfect in terms of overall weight and stability of the flange, which indicates that the axial retention of the blades upstream is not optimal and completely efficient. Besides, this structure is not suitable when the disc, for the purpose of optimizing and reducing the overall dimensions, comprises an upstream clamp which extends inwards for bolting the frusto-conical cover and bolting a ring preventing the rotation of the flange axially holding the blades.

The aim of the present invention is to provide a simple, efficient and economical solution to this problem, including as such, possibly independent of the aforementioned and claimed inlet diameter and hub ratio constraints.

For this purpose, the invention provides for an annular cover to be mounted on the disc upstream of the blades, and means for axially retaining the blades on the disc comprising a flange mounted in an annular groove of the disc and forming an axial support for the roots of the blades, with the flange comprising a curled radial annular rim cooperating with a curled radial annular rim of the annular groove of the disc, so as to ensure the axial locking of the flange in the annular groove of the disc, and means for rotationally locking the flange, comprising a ring having lugs extending radially inwards and formed with fastening means on an upstream radial face of the disc, with said cover being fixed on the disc by fastening means partly common to the means for fastening at least some lugs of the ring on the disc, characterized in that said ring further comprises at least one radial projection cooperating with a stop matching the flange, so as to rotationally lock the flange relative to the ring.

The structure defined above enables a more compact assembly than in the prior art, thereby allowing a radially outermost location and concentration of the fastening means between the cover, the flange and the disc, for a greater flexibility of design of the surrounding turbine engine. Furthermore, the fixing ring used in the invention described above has a smaller mass than the ring used in the document WO 2012/114032, because it has no tooth axially extending in the downstream direction.

According to a particular embodiment, the disc comprises an upstream clamp extending inwards and having holes aligned with holes in the lugs for the passage of the screws for fixing the ring on the disc axially. The screws provide a rigid attachment ensuring the anti-rotation between the ring and the disc.

The ring advantageously comprises a cylindrical portion from which the radial projections radially extend outwards, with the lugs radially extending inwards from the upstream edge of the cylindrical portion, with the cylindrical portion of the ring being radially supported on said clamp of the disc.

Thus, the ring matches the shape of the clamp where it is fixed for a reduction in the overall dimensions required for fixing the ring on the disc.

The stops of the flange cooperating with the radial projections of the ring are preferably formed by curls arranged on an upstream edge of the flange.

The flange held in axial abutment on the blades at the downstream edge thereof is thus held rotationally fixed at the upstream edge by the ring projections. Such retention provided at each edge of the flange gives the latter a greater stability than the flanges used in the prior art.

According to another characteristic, one of the curls is formed on the upstream edge of the flange, in axial alignment with each rib of the disc. The curls may further be arranged in the alignment of such ribs only. This ensures a better balance when the fan rotor is rotating.

Advantageously, a radial projection of the ring is inserted every two curls of the flange. This is enough to ensure the anti-rotation of the flange while reducing the mass of the ring.

According to another characteristic, the cover has, in its central part, an inner annular rim wherein axial blind holes are formed which open downstream and are used for housing fixing screw heads of the ring on the disc, and axial through-holes for the passage of screws for the common fixing of the cover and of the ring on the disc.

Some ring lugs are thus traversed by screws used for fixing the cover and the ring on the disc and other ring lugs are traversed by screws used for fixing the ring on the disc only. Besides, when the cover is made of a light material such as aluminum, a risk exists of the latter being torn, for example if a bird is sucked up into the fan. The tearing off of the cover then cannot lead to the disconnection of the ring from the disc. As a matter of fact, the tearing off of the cover has no effect on the screws used for fixing the ring and the disc only. Any coming out of the flange for axially holding the blades and thus any accidental ejection of one or more fan blades are thus prevented.

The screws fastening the ring on the disc preferably alternate with the common screws for fixing the cover and the ring to the disc.

In one embodiment, an indexing pin is mounted in one of the aligned holes of the ring and the disc and includes an upstream head received in a blind hole of the internal radial rim of the cover. The indexing pin provides an angular reference between the ring and the disc which is useful when disassembling and assembling the fan rotor.

A turbine engine having a fan rotor as described above, is also concerned.

A ring is further provided which is intended for a fan rotor as disclosed above, comprising a cylindrical portion comprising an inner cylindrical face and an outer cylindrical face from which radial projections regularly extend radially outwards, with lugs extending radially inwards of the cylindrical portion from an edge of the cylindrical portion, with each lug being located substantially between each pair of adjacent projections.

The invention eventually relates to an annular flange for a fan as disclosed above, comprising a substantially frusto-conical wall of a variable thickness, the end with the larger diameter of which is connected to an annular rim extending inwards and being regularly curled, and the end with the smaller diameter of which is regularly curled.

The fan rotor described above, the particular design of which directly results from the hub ratio selection within the framework of achieving a small-sized turbine engine further has an unexpected technical and particularly advantageous effect, within the technical scope described below.

The particular selection of the hub ratio mentioned in this patent application in fact implies an overall reduction in the dimensions of the turbine engine fan disc as compared to the prior art. This disc has an external diameter with a value typically ranging from 245 to 275 mm. It is however necessary for this disc to meet the requirements relative to the continued operation of the fan blades, the number and size of which are relatively identical with those of the prior art. For this purpose, the number of blades is preferably between 17 and 21 blades, more particularly between 18 and 20 blades. The height and width of the grooves on the disc, according to the knowledge of the present technology, must not be reduced in size, so as, on the one hand to enable the engagement of the downstream axial retention hooks of the blades mentioned in this application, and on the other hand be adapted to the size of the blade roots the dimensions of which have not been reduced in order to support the rotating blades.

The simultaneous requirements regarding the preservation of the dimensions of the grooves of the disc, and the reduction in the overall diameter of the disc, then necessarily imply a reduction in the width, i.e. the circumferential dimension, of the ribs of the disc. The ribs of the fan disc, then thinner than in the prior art providing a higher hub ratio, thus have a greater fragility and a greater risk of breakage relative to the torque supported in operation, than the ribs of the prior art.

Making the fan disc of a highly resistant inconel alloy to remedy this problem has been suggested. This alloy is however very heavy, which affects the overall performances of the turbine engine, and therefore is not satisfactory.

As regards the fan rotor described above, it has surprisingly been noted that the axial locking of the blades provided by the inventive locking flange was sufficiently effective and resistant to do without the axial blocking by the downstream hooks of the blade roots engaged into the low-pressure compressor, in view of a turbine engine the dimensions of which were specified above. The inventors have therefore advantageously removed the downstream hook, and therefore have been able to reduce the radial height of the grooves of the fan disc, a part of which was previously devoted to the mounting of the downstream hooks, typically at a height ranging from 18 to 22 mm.

Still another aspect of this issue relates to the shims which are then used at the bottoms of the grooves to hold the blades high against the ribs. Such shims must then fulfil the functions of limiting the displacement of the blade roots in the grooves in operation, of protecting the bottoms of the grooves, and of damping the blades if they break or if the turbine engine sucks up a voluminous body. To optimally comply with these requirements, especially within the new scope described above, the shims selected here have been radially thinned relative to the existing solutions, and have, each, a radial thickness typically ranging from 1 to 3 mm, particularly equal to 2 mm, provided that such shims could be provided even without the aforementioned and claimed constraints imposed for the inlet diameter and the hub ratio. Each shim is more particularly in the form of a board with two faces, extending along the axis of the fan and positioned against the bottom of one of the grooves. Such shim is symmetrical in the three axial, radial, and circumferential directions, which prevents possible mounting errors. Each face of the shim preferably has chamfered side or circumferential edges, with the chamfers each forming an angle of 10°, plus or minus 2°, with a face. The chamfers on each radially opposite face join at the side ends of the shim so as to form the two side edges of the shim. The junction angles between the faces of the shim and the chamfers are preferably rounded so as to have a radius of curvature ranging from 1.50 mm to 1.80 mm, and more particularly equal to 1.65 mm, and the junction angles between the bevels forming the side edges of the shim are preferably rounded so as to have a radius of curvature ranging from 0.45 mm to 0.75 mm, more especially equal to 0.6 mm. Each shim preferably has a side dimension between 17.0 mm and 18.2 mm, and more particularly equal to 17.6 mm.

The reduction in the radial dimension of the grooves directly implies a reduction in the radial ribs, the proportions of which are then more compact and more resistant to bending moments in operation. With the solution provided here, the structure of the ribs of the fan disc offers a sufficiently strong structure to be made of a much lighter titanium alloy than inconel alloy.

It is thus possible to provide for a fan rotor without any means for the axial holding of the fan blades on the fan disc, downstream of the blades. This fan rotor comprises the upstream flange as described in the present patent application as means for axially holding the blades. This characteristic is particularly relevant within the scope of fans for small-sized turbine engines relating to the invention and having the dimensions and the hub ratio described above. It is therefore proposed here for this type of fan, to make the fan disc of titanium alloy, especially an alloy of the TA6V or TI17 (TA5CD4) type.

Besides, the reduction in the radial dimension of the grooves of the fan disc makes it possible to form the inner face of this disc, with a balancing profile from a frustoconical bore coaxial to the axis of the fan, and the radius of which increases in the downstream direction. This balancing profile, in addition to well balancing the fan disc, has a minimum diameter, upstream, with a value typically ranging from 120 to 140 mm, which is larger than the minimum diameter of the balancing leek profile used for the higher grooves, for an equivalent external diameter of the disc. This new balancing profile of the disc provides a larger annular space in the middle of the fan disc for the axial passage of tools required for mounting and tightening of the means for fastening the fan disc on the shaft of the turbine engine, with such means being positioned downstream of the disc.

The various aspects of the solutions disclosed herein will be better understood, and other details, characteristics and advantages thereof will appear upon reading the following description given by way of a non restrictive example whereas referring to the appended drawings wherein.

Figure 1:
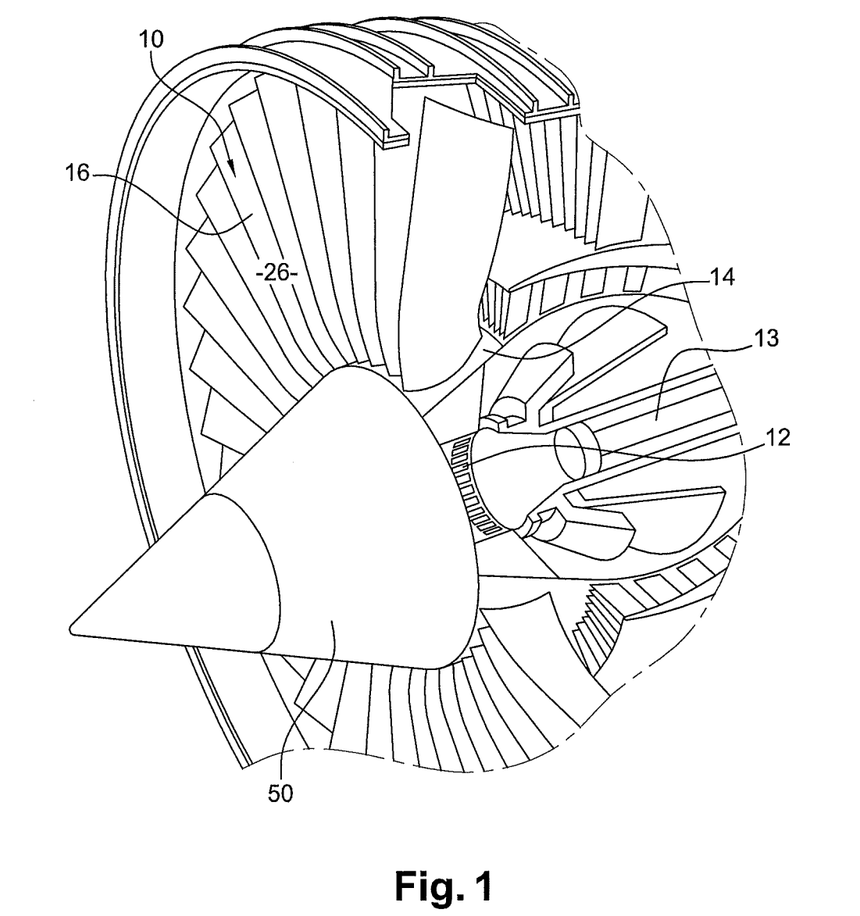
FIG. 1 is a perspective view with a partial lifting of a turbine engine blade according to the prior art.
Figure 2:
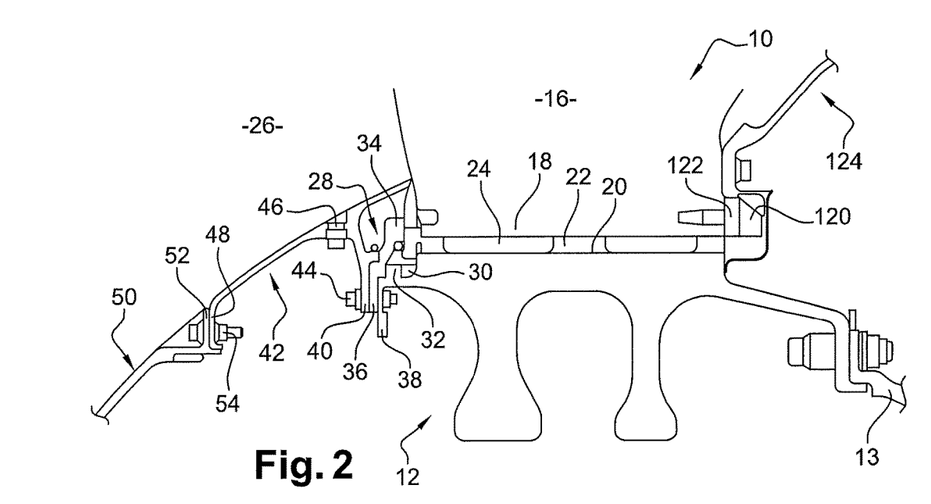
FIG. 2 is a partial schematic half-view in axial section of a turbine engine fan rotor according to the prior art.
Figure 3:
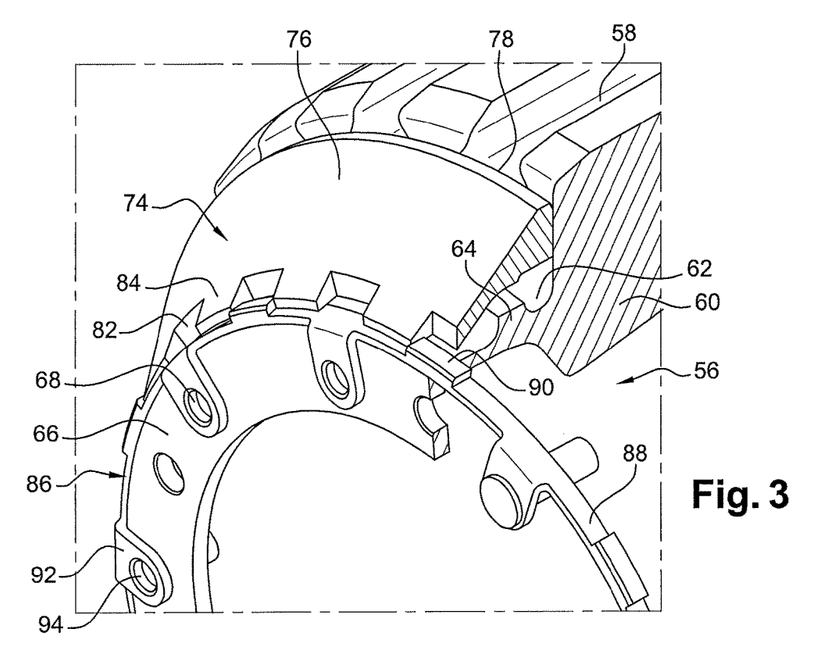
FIG. 3 is a perspective view of an actualized turbine engine rotor, with the cover being lifted.
Figure 4:
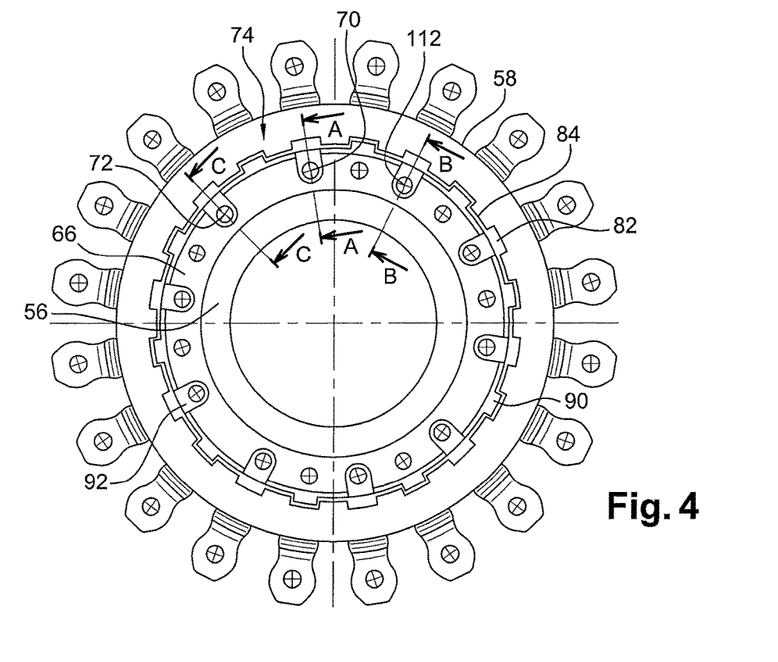
FIG. 4 is seen from the front and the cover is lifted.
Figure 5:
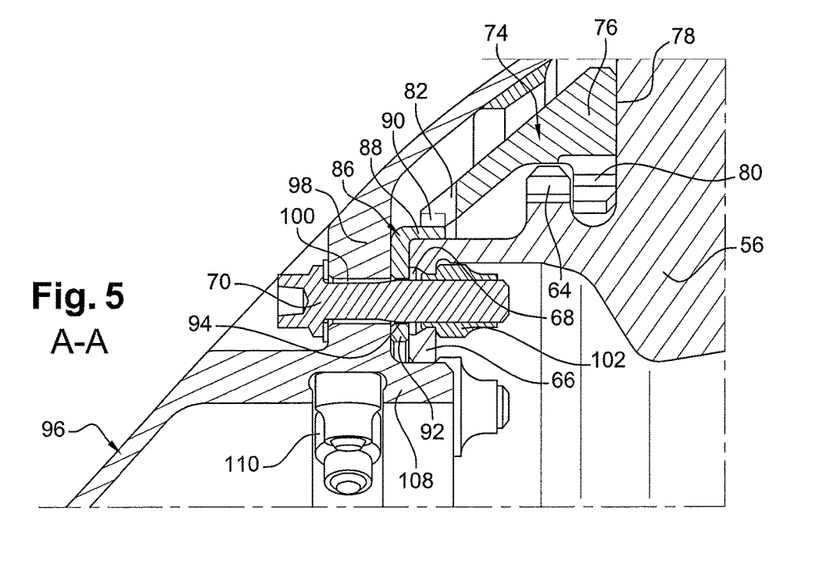
FIGS. 5, 6 and 7 are respective views of the AA, BB and CC sections of FIG. 4.

Reference is first made to FIGS. 1 and 2 which show a fan for a turbine engine according to the art prior to the present invention.

This fan comprises blades 10 carried by a disc 12 and between which inter-blade platforms 14 are inserted, with the disc 12 being secured to the upstream end of a shaft 13 of a turbine engine.

Each fan blade 10 comprises a vane 16 connected at the radially internal end thereof to a root 18 which is engaged into a substantially axial groove 20 having a shape matching that of the disc 12, formed between two ribs 22 of the disc 12 and making it possible to radially hold this blade 10 on the disc 12. A shim 24 is inserted between the root 18 of each blade 10 and the bottom of the matching groove 20 of the disc 12 to radially lock the blade 10 on the disc 12.

The inter-blades platforms 14 form a wall which internally defines a section 26 of the airflow entering the turbine engine, and comprise means which cooperate with matching means provided on the disc 12 between the grooves 20 to fix the platforms on the disc.

The fan blades 10 are axially held in the grooves 20 of the disc 12 by suitable means mounted on the disc 12, upstream and downstream of the blades 10.

The upstream holding means comprise an annular flange 28 coaxially inserted and fixed on the upstream end of the disc 12.

The flange 28 includes an internal annular flange 30 which is curled or toothed and which cooperates with an outer annular rim 32 of the toothed or curled disc 12 to axially immobilize the flange 28 on the disc 12. The flange 28 is supported by an outer rim 34 on the shims 24 of the blade roots 18.

The flange 28 further comprises an internal annular flange 36 which is inserted between a matching annular flange 38 of the disc 12 and an inner annular flange 40 of a shroud 42 arranged upstream of the fan disc 12. The clamps 36, 38, 40 comprise axial holes 44 (not shown) for the passage of screws or the like for clamping the flanges together.

The shroud 42 has a substantially frusto-conical shape which widens in the downstream direction, with the wall defined by the inter-blade platforms extending in the axial extension of such shroud 42. This shroud 42 comprises radial bores for mounting balancing screws and a clamp 48 located at the upstream end thereof. A conical cover 50 is mounted on the upstream portion of the shroud 42. More specifically, the cover 50 has a clamp 52 at its downstream end, fixed to the upstream clamp 48 of the shroud 42 by means of screws 54.

Downstream of the blade 10, axial holding is enabled by a hook 120 formed at the downstream end of the blade 10 and which engages into a notch 122 formed at the upstream end of a compressor 124 extending the section 26 downstream of the fan.

Such a structure has the disadvantages described above. In particular, it is not suitable to a fan having a relatively small diameter.

FIGS. 3 to 7 illustrate one embodiment of a fan rotor according to the solution developed in this patent application, comprising as above, a disc 56 carrying blades (not shown) the roots of which are engaged into substantially axial grooves 58 of the outer periphery of the disc 56.

The disc comprises an annular rim 60 without balancing leeks and extended upstream by an annular portion having an annular groove 62 defined between an upstream face of the rim and a radial edge 64 extending outwards. The upstream end of the annular portion has a clamp 66 extending radially inwards and spaced from the edge 64, and comprising, regularly distributed over the entire circumference thereof, axial holes 68 for the passage of screws 70, 72. The edge 64 is curled or toothed and includes solid portions alternating with recessed portions.

The fan rotor is provided with axial holding means in the upstream direction of the blades on the disc. These comprise a flange 74 mounted in the annular groove 62 of the disc 56 and forming an axial support for the roots of the blades.

The flange 74 comprises a substantially frusto-conical wall 76 that flares in the downstream direction, and the thickness of which increases in the downstream direction. The flange 74 is delimited at its downstream end by a radial face 78 bearing against the blades. The flange 74 includes, at its downstream end, an internal annular flange 80 which is curled or toothed and includes alternating solid portions and recessed portions and has shapes substantially matching those of the edge 64 of the disc 56 to enable the mounting and dismounting of the flange 74 in the annular groove 62 by axial translation, a rotation of the flange 74 relative to the disc 56, and an axial blocking of the flange 74 in the groove 62 of the disc by having the solid portions of the rim 80 of the flange rest against the solid portion of the edge 64 of the disc.

The flange 74 finally comprises curls or recessed portions 82 alternating with solid portions 84 on the upstream edge.

The flange 74 is prevented from rotating by means of a ring 86 having a cylindrical portion 88 limited by inner and outer cylindrical surfaces. The outer face has projections 90 extending radially outwards, and circumferentially along said outer surface of the cylindrical portion 88, and engaging into the curls 82 the upstream edge of the flange 74 and providing a stop against the solid portions 84 of the upstream edge of the flange 74 to prevent the rotation thereof. The upstream edge of the ring is connected to lugs 92 extending radially inwards, formed with holes 94 for the passage of screws. Upstream, these lugs are axially in contact with the clamp 66 of the disc 56 so that the holes 94 of the lugs 92 are aligned with the holes 68 in the clamp 66 and the cylindrical portion 88 of the ring axially bears from the outside against the clamp 66 of the disc. The ring 86 may be made of high-alloy steel so as to resist tearing.

The flange 74 is thus prevented from rotating by abutment of its solid portions 84 against the projections 90 of the ring.

A cover 96, for example made of aluminum and of conical shape, is fixed on the disc 12. For this purpose, the cover 96 comprises, in its middle part, an internal annular rim 98 wherein axial through-holes 100 are formed (FIG. 5), located opposite one hole 94 out of two on the ring 86 and aligned with some holes 68 in the clamp 66 of the disc 56. These holes 100 are traversed by the screws 70 cooperating with nuts 102 accommodated against the downstream side of the flange 66 of the disc 56 and making it possible to assemble the cover 96, the ring 86 and the disc 56. The downstream portion of the cover 96 covers the ring 86 and the flange 74 so that the inner section 26 defined by the inter-blade platforms extends in the axial extension of the downstream portion of the cover 96.

Figure 7:
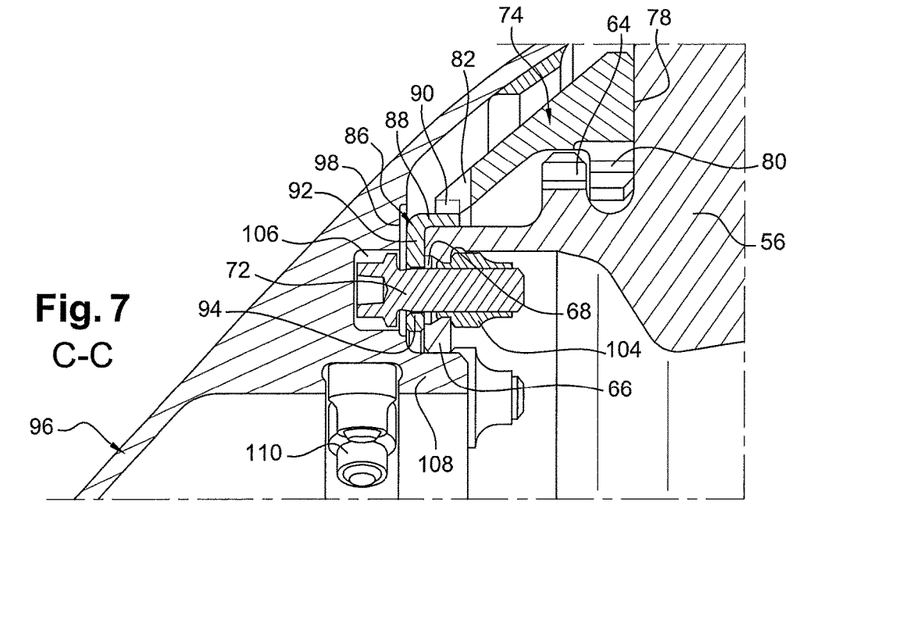

As shown in FIG. 7, all the other holes 94 of the ring but one located opposite other holes 68 of the clamp 66 of the disc 56, are traversed by screws 72 cooperating with nuts 104 and used only for fixing the ring 86 on the disc 56. The heads of these screws are accommodated in blind holes 106 provided in the inner rim 98 of the cover 96.

The internal rim 98 of the cover 96 also comprises a cylindrical collar 108 extending downstream, the end of which abuts against the internal end of the clamp 66 of the disc.

Figure 6:
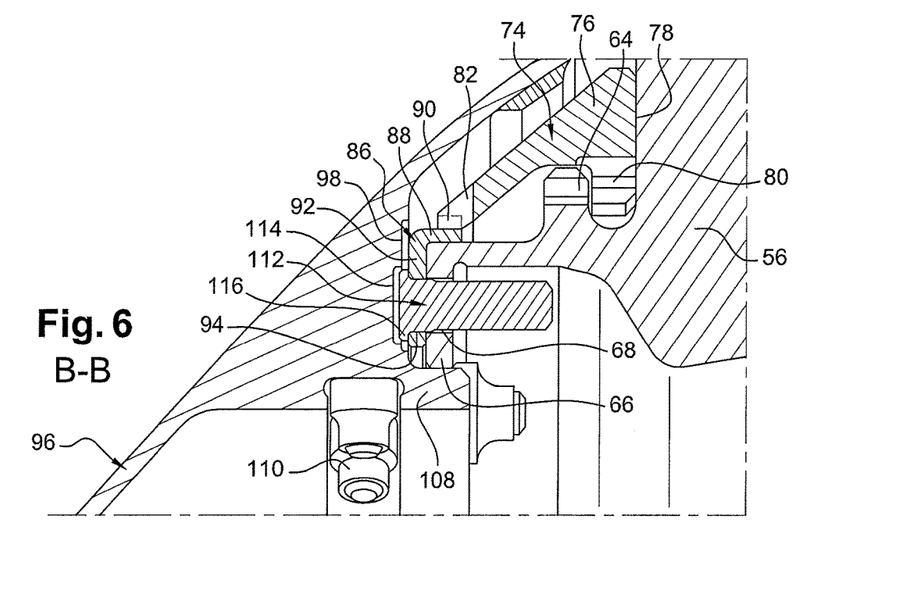

The cover 96 further comprises radial threads 110 used for mounting balancing screws, as is well known in the prior art. To ensure the correct positioning of the screws, the cover 96 position must be indexed relative to the fan rotor. For this purpose, as shown in FIG. 6, an indexing pin 112 is mounted in the last hole 94 of the ring aligned with a hole 68 of the clamp 66 of the disc 56. The pin 112 includes a head 116 accommodated in a blind hole 114 of the inner rim 98 of the cover 96, with the diameter of the head 116 of the pin 112 being determined so that it cannot be inserted into another blind hole 106, provided for accommodating the screw heads 72.

Figure 8:
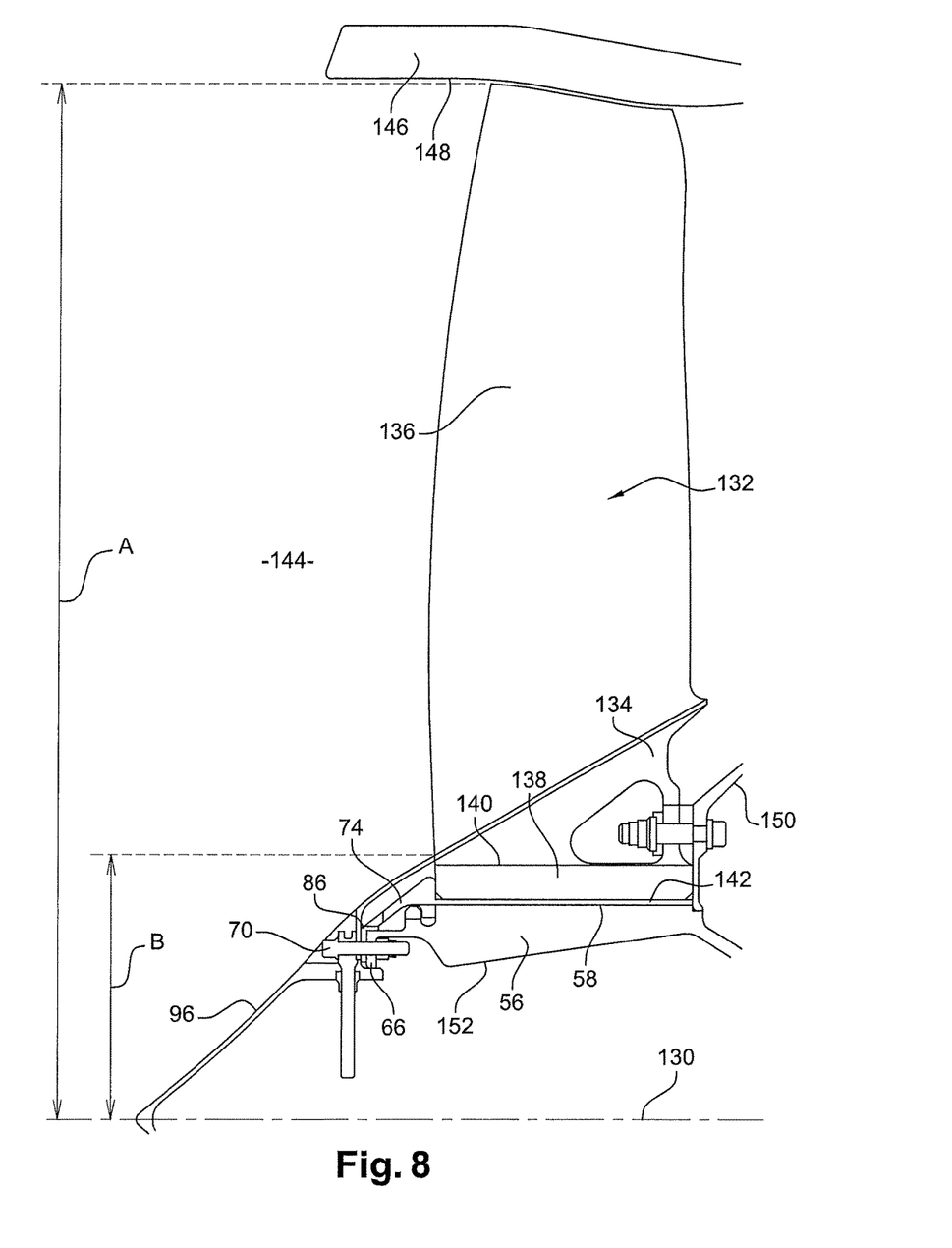
FIG. 8 is a partial schematic full-scale view, in axial section, of a turbine machine fan according to the invention.

Reference is made now to FIG. 8 which shows an overall full-scale view of the fan according to the invention, comprising the rotor described above. The disc 56 is arranged around the axis 130 of the turbine engine, and is rotationally driven by a downstream drive shaft (not shown). Blades 132, between which inter-blade platforms 134 are inserted, are carried by the disc 56.

Each fan blade 132 comprises a vane 136 connected at its radially internal end to a foot 138 which is engaged into a substantially axial groove 58 having a shape matching that of the disc 56, formed between two ribs 140 of the disc 56 and making it possible to radially hold this blade 132 on the disc 56.

The fan blades 132 are axially held in the grooves 58 of the disc 56 through means 74, 86, 70, 96 described above and arranged upstream of the blades 132.

A shim 142 is inserted between the foot 138 of each blade 132 and the bottom of the matching groove 58 of the disc 56 to radially immobilize the blade 132 on the disc 56.

The inter-blade platforms 134 form a wall which internally delimits the section 144 of the airflow entering the turbine engine, and comprises means which cooperate with matching means provided on the disc 56 between the grooves 58 to fix the platforms on the disc.

The blades 132 are surrounded by an annular outer casing 146 defining the air inlet of the turbine engine. The outer casing 146 comprises an annular inner wall 148 externally delimiting the section 144 of the airflow entering the turbine engine, and opposite which the external ends of the blades 132 circumferentially move in rotation.

The hub ratio of the fan shown is the ratio of the distance B between the axis of the turbine engine 130 and the inner limit of the section 144 at the leading edge of the blade 132, divided by the distance A between the axis 130 of the turbine engine and the external ends of the blades 132. The fan shown in FIG. 8 is so designed as to obtain a hub ratio which may range from 0.25 to 0.27, whereas the distance A has a value ranging from 450 to 600 mm. This selection of a hub ratio involves using a disc the outer limit of which, at the top of the ribs, ranges from 115 mm to 145 mm.

Eventually, as already mentioned above, the means 74, 86, 70, 96 for the axial retention of the blades 132 are quite efficient in that, contrary to the fan of the prior art shown in FIGS. 1 and 2, the fan according to the invention shown in FIG. 8 has no hook for axially retaining the blades 132 arranged downstream of the blades 132. On the contrary, as can be seen, the low pressure compressor 150 arranged downstream of the fan disc 56 is directly supported by the downstream ends of the blade roots 138 and the ribs 140 of the disc. No constraint exists any longer as regards the radial depth of the ribs related to the engagement of the downstream hooks.

Figure 9:
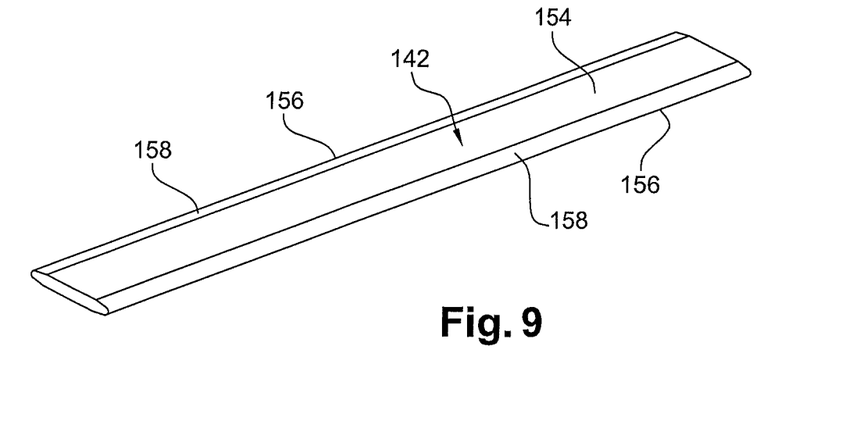
FIG. 9 is a perspective view of a shim used in the fan according to the invention.
Figure 10:
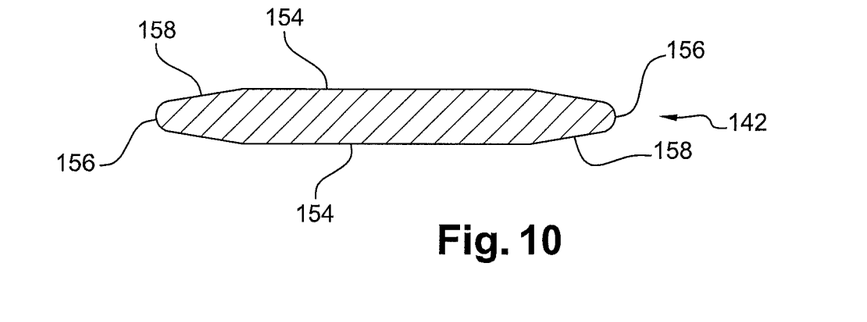
FIG. 10 is a sectional view of the same shim.

Therefore, the grooves 58 are radially shallower, with a height ranging from 18 mm to 22 mm, than the grooves adapted for positioning a hook for axially retaining the blades. The shims 142 used to hold the blade roots 138 radially against the ribs 140 are also radially thinner. The ribs 140, which are thus shorter, are then compact enough to resist deformation and breakage. This improved strength of the ribs 140 makes it possible to make the disc of a relatively light titanium alloy as compared to an Inconel alloy, for example. Moreover, considering the new weight distribution of the disc which results from the change in the height of the grooves, the inner wall 152 of the disc 56 has been formed to have a balancing profile of the disc 56 different than that of the prior art with leeks. This profile of the wall 152 is frusto-conical and widens in the downstream direction. Proportionally to the disc, such balancing profile extends not so far as the leeks towards the inside of the turbine engine, to a minimum radius within the scope of the invention between 60 mm and 70 mm, which represents the internal limit of the disc. This profile thus allows the passage of larger tools in the axial access space from upstream, at the center of the disc 56, and commonly used when mounting the turbine engine. Reference is made now to FIGS. 9 and 10 which show the shims 142, with the latter having been adapted to the reduction in the depth of the grooves 58. Each shim more particularly has the shape of a double-sided board 154 extending along the axis of the fan, and positioned against the bottom of one of the grooves 58. Such shim is symmetrical in the three axial, radial, and circumferential directions, which prevents possible mounting errors. Each face of the shim has its lateral or circumferential edges 156 chamfered, with the chamfers 158 each forming an angle of 10° with one face. The chamfers 158 of each radially opposite face 154 join at the side ends of the shim so as to form the two side edges 156 of the shim. The junction angles between the faces 154 of the shim 158 and the chamfers are rounded so as to have a radius of curvature between 1.50 mm and 1.80 mm, and more particularly equal to 1.65 mm. The junction angles between the respective chamfers 158 forming the side edges 156 of the shim are rounded so as to have a radius of curvature between 0.45 mm and 0.75 mm, more especially equal to 0.6 mm. Each shim 142 has a radial thickness between 1 mm and 3 mm, more preferably equal to 2 mm and a side dimension between 17.0 mm and 18.2 mm, more preferably equal to 17.6 mm.

The invention claimed is:

1. A fan of a turbine engine, the fan having an inlet provided with fan blades, an annular casing, and a hub rotating about an axis of the turbine engine and carrying the blades, which extend radially relative to said axis in an annular section delimited internally by the hub and externally by the annular casing, with said hub comprising a fan disc having, at its outer periphery, axial ribs alternating with grooves wherein roots of the blades are engaged, with said fan having an inlet diameter matching a diameter, having a value between 900 mm and 1,551 mm, of a circle comprising radially external ends of the blades, and having a hub-to-tip ratio, which is the hub-to-tip ratio of a diameter of an inner limit of a section at radially internal ends of leading edges of the fan blades divided by the inlet diameter, having a value between 0.20 and 0.265, the fan further comprising:
    an annular cover mounted on the disc upstream of the blades, and
    means for axially retaining the blades on the disc, said means for axially retaining comprising a flange mounted in an annular groove of the disc and forming an axial support for said roots of the blades, with the flange comprising a curled radial annular rim and at least two stops, the curled radial annular rim cooperating with a curled radial annular edge of the annular groove of the disc, so as to ensure an axial locking of the flange in the annular groove of the disc,
    means for rotationally locking the flange, said means for rotationally locking comprising a ring having lugs extending radially inwards and formed with a first set of fastening means on an upstream radial face of the disc, with said cover being fixed on the disc by a second set of fastening means including at least a portion of the first set of fastening means for fastening at least some of said lugs of the ring on the disc, and further comprising at least one of:

said ring comprising at least two first radial projections, a first projection of the at least two first radial projections cooperating with a first stop of the at least two stops of the flange and a second projection of the at least two first radial projections cooperating with a second stop of the at least two stops of the flange, and said ring comprising at least one second radial projection cooperating with the first stop of the at least two stops of the flange and the second stop of the at least two stops of the flange.

2. The fan according to claim 1, wherein the inlet diameter is between 900 mm and 1,200 mm.

3. The fan according to claim 1, wherein the disc comprises an upstream clamp extending radially inwards and having holes aligned with holes in the lugs for the passage of the first and second sets of fastening means.

4. The fan according to claim 3, wherein the ring comprises a cylindrical portion from which said at least one second radial projection extends radially outwards, with the lugs extending radially inwards from an upstream edge of the cylindrical portion, with the cylindrical portion of the ring being radially supported on said clamp of the disc.

5. The fan according to claim 1, wherein said at least two stops of the flange are formed by curls provided on an upstream edge of the flange.

6. The fan according to claim 5, wherein each curl is formed on the upstream edge of the flange in axial alignment with one of said axial ribs of the disc.

7. The fan according to claim 1, wherein the cover has in a central part thereof, an inner annular rim wherein axial blind holes are formed and are used for housing fixing screw heads of the first and second sets of fastening means, and axial through-holes for the passage of the first and second sets of fastenings means.

8. The fan according to claim 1, wherein the ring comprises a cylindrical portion comprising an inner cylindrical face and an outer cylindrical face from which said at least two first radial projections extend radially outwards, with said lugs extending radially inwards of the cylindrical portion from an edge of the cylindrical portion, with each lug being located between a pair of adjacent first radial projections of the at least two first radial projections.

9. The fan according to claim 1, wherein the flange is annular and comprises a frusto-conical wall of a variable thickness, the frusto-conical wall having a large-diameter end and a small-diameter end, wherein the large-diameter end includes said curled radial annular rim, and wherein the small-diameter end is curled.

10. The fan according to claim 1, wherein the disc has an outer limit, a diameter of which is between 245 mm and 275 mm, formed by external ends of the rib and an inner limit, a diameter of which ranges from 120 mm to 140 mm, formed by an internal end of a balancing profile of the disc.

11. The fan according to claim 1 wherein the disc has an outer limit, a diameter of which is between 245 mm and 275 mm, formed by external ends of the ribs, and wherein the grooves of the disc have a radial dimension, between a bottom of the grooves and a top of the ribs, with a value ranging from 18 mm to 22 mm.

12. The fan according to claim 1, wherein a shim having a radial thickness ranging from 1 mm to 3 mm is radially inserted between one of roots of the blades and a bottom of one of the grooves.

13. The fan according to claim 10, wherein the balancing profile of the disc is formed by an internal bore, a frusto-conical shape of which widens in a downstream direction, with an upstream end of the bore forming the inner limit of the disc.

14. The fan according to claim 1, wherein the disc carries from 17 to 21 blades.

15. The fan according to claim 1, wherein the disc is made of a titanium alloy.

16. A turbine engine comprising a fan according to claim 1.

* * * * *